United States Patent [19]

Hendricks

[11] Patent Number: 4,548,767
[45] Date of Patent: Oct. 22, 1985

[54] METHOD TO PRODUCE LARGE, UNIFORM HOLLOW SPHERICAL SHELLS

[75] Inventor: Charles D. Hendricks, Livermore, Calif.

[73] Assignee: The United States of America as represented by the United States Department of Energy, Washington, D.C.

[21] Appl. No.: 535,464

[22] Filed: Sep. 26, 1983

[51] Int. Cl.[4] .............................................. B29C 6/00
[52] U.S. Cl. ........................................ 264/7; 65/21.4; 65/22; 264/5; 264/10; 264/43; 264/55; 264/131; 264/574; 264/DIG. 6; 425/6
[58] Field of Search .................. 264/5, 7, 10, 43, 574, 264/DIG. 6, 55; 425/6; 65/21.4, 22

[56] References Cited

U.S. PATENT DOCUMENTS

| | | | |
|---|---|---|---|
| 2,793,398 | 5/1957 | Hallie et al. | 264/7 |
| 2,797,201 | 6/1957 | Veatch et al. | 264/54 |
| 2,894,918 | 7/1959 | Killoran et al. | 264/54 |
| 2,978,340 | 4/1961 | Veatch et al. | 264/DIG. 6 |
| 3,036,338 | 5/1962 | Nack | 264/7 |
| 3,472,801 | 10/1969 | Lerman et al. | 264/5 |
| 4,021,253 | 5/1977 | Budrick et al. | 264/140 |
| 4,059,423 | 11/1977 | De Vos et al. | 264/43 |
| 4,133,854 | 1/1979 | Hendricks | 264/10 |
| 4,163,637 | 8/1979 | Hendricks | 425/6 |
| 4,257,798 | 3/1981 | Hendricks et al. | 264/43 |
| 4,257,799 | 3/1981 | Rosenewaig et al. | 264/43 |
| 4,279,632 | 7/1981 | Frusch et al. | 264/5 |
| 4,322,378 | 3/1982 | Hendricks | 264/7 |
| 4,344,787 | 8/1982 | Wang et al. | 264/5 |
| 4,400,191 | 8/1983 | Youngberg et al. | 264/5 |

Primary Examiner—Jeffery Thurlow
Assistant Examiner—Patrick Dailey
Attorney, Agent, or Firm—Henry P. Sartorio; L. E. Carnahan; Judson R. Hightower

[57] ABSTRACT

Large, uniform hollow spherical shells are produced by forming uniform size drops of heat decomposable or vaporizable material, evaporating the drops to form dried particles, coating the dried particles with a layer of shell forming material, and heating the composite particles to melt the outer layer and decompose or vaporize the inner particle to form an expanding inner gas bubble which expands the outer layer. By cycling the temperature and pressure on the hollow shells, spherical shells with uniform walls are produced.

21 Claims, 4 Drawing Figures

```
HEAT DECOMPOSABLE / VAPORIZABLE MATERIAL
                │
                ▼
         DROPLET GENERATOR
                │
                ▼
           UNIFORM DROPS
                │
                ▼
            EVAPORATION
                │
                ▼
         DRIED SOLUTE PARTICLES
                │
                ▼
              COATING
                │
                ▼
      PARTICLE WITH SHELL FORMING LAYER
                │
                ▼
               HEAT
                │
                ▼
          VISCOUS OUTER LAYER
                │
                ▼
               HEAT
                │
                ▼
      DECOMPOSE / VAPORIZE INNER PARTICLE
                │
                ▼
          GAS BUBBLE EXPANDS
                │
                ▼
         INCREASE SHELL DIAMETER
                │
                ▼
      CYCLE TEMPERATURE AND PRESSURE
                │
                ▼
         SHELLS WITH UNIFORM WALLS
```

FIG. 1

METHOD TO PRODUCE LARGE, UNIFORM HOLLOW SPHERICAL SHELLS

BACKGROUND OF THE INVENTION

The United States Government has rights in this invention pursuant to Contract No. W-7405-ENG-48 between the U.S. Department of Energy and the University of California.

The invention relates to the production of hollow spheres and, more particularly, to the production of hollow spherical shells in the millimeter to centimeter diameter size range having uniform thickness, diameter and surface smoothness, for a variety of purposes including use as inertial confinement fusion targets.

The shortage and instability in the supply of oil and other fossil fuels has spurred an active interest in the development of alternative methods of energy production. Fusion is a nuclear process which presents a virtually inexhaustable source of energy. A stoichiometric mixture of deuterium and tritium is the easiest fusion fuel to ignite in a deuterium-tritium fuel cycle which regenerates tritium from lithium. The cycle basically involves the consumption of deuterium and lithium materials which are sufficiently abundant to insure the long term potential of the process. One method in which the fusion process can be carried out is inertial confinement fusion which includes the more particular method of laser fusion. A small capsule containing fusion fuel, preferably a deuterium-tritium fuel mixture, is imploded by a particle beam or laser beam to produce a fusion reaction of the fuel, releasing large amounts of energy in the form of energetic neutrons. A reactor can utilize a lithium blanket to breed tritium by the interaction of the neutrons with the lithium.

Initial laser fusion experiments performed with simple hollow glass microspheres on the order of 100 microns in diameter filled with a deuterium-tritium fuel mixture demonstrated that a fusion reaction could be produced. More complex targets required for advanced research are made up of multiple shells of a variety of materials, including layers of polymeric materials and metal shells. These multi-layered targets are of a larger size, typically up to 500 microns in diameter or larger, to be useful for laser fusion. The targets, and each of the individual shells of a multi-layer target, must have a high degree of sphericity, concentricity and surface smoothness. Going beyond fusion research to an operating fusion power plant will require much larger targets, in the millimeter and even the centimeter size range. The high quality targets required must be mass produced and fed into a reactor chamber where the targets will be imploded at a repetition rate of typically 1–10 Hz.

Methods for producing small hollow glass spheres in the 50–500 micron size range have been developed at Lawrence Livermore National Laboratory. A liquid droplet method and apparatus for producing small hollow spheres utilizing a multi-zone vertical oven is described in U.S. Pat. Nos. 4,133,854 and 4,163,637 to Hendricks issued Jan. 9, 1979 and Aug. 7, 1979, respectively, and in U.S. Pat. No. 4,257,799 to Rosencwaig, et al. issued Mar. 24, 1981. In these methods a liquid droplet of glass forming material, in some cases with a blowing agent added, is dropped through a vertical multi-zoned furnace having a plurality of regions of controlled temperature to undergo a process which produces glass shells. Alternatively, the dried gel method can also be utilized to produce small glass microspheres, generally providing a wider range in composition and producing larger diameters and wall thicknesses than the liquid droplet method. A dried gel frit of glass forming material is dropped through a vertical multi-zoned furnace similar to the furnace utilized in the liquid droplet method to undergo a process which produces small glass microspheres. U.S. Pat. No. 4,021,253 to Budrick, et al. issued May 3, 1977 is directed to the production of glass frit.

Considerable effort is being expended on the development of methods to produce a variety of shells and coatings, both of polymeric materials and metals. Both glass spheres and metal spheres are being produced by liquid droplet or dried gel frit methods. Target quality coatings of fluorocarbon and hydrocarbon polymers as well as metals including gold, platinum, copper and beryllium are being performed. A molecular beam levitator has been used with a plasma polymerization coater to provide high quality polymer coatings for targets and to produce sputter deposited metallic coatings. An rf helical resonator has been used to deposit hydrocarbon and fluorocarbon coatings on glass microspheres, to produce tungsten coating from tungsten fluoride and to seed hydrocarbon and fluorocarbon polymers with a variety of volatile materials including nitrogen, oxygen, chlorine and bromine. The electroplating process has been utilized to produce coatings on glass microspheres. Electroless plating may also be utilized. Work has been done in producing free standing hemispherical shells of hydrocarbon polymer, of beryllium and of lead styrene which can be assembled in pairs to produce shells.

It is an object of the invention to produce hollow spherical shells of a variety of materials.

It is also an object of the invention to produce hollow spherical shells in the size range of millimeter to centimeter diameters.

It is a further object of the invention to produce hollow spherical shells having the high degree of sphericity, concentricty and surface smoothness necessary for many applications including use as fusion targets.

SUMMARY OF THE INVENTION

The invention is a method to produce large uniform hollow sperhical shells by (1) forming uniform size drops of heat decomposable or vaporizable material, (2) evaporating the drops to form dried particles, (3) coating the dried particles with a layer of shell forming material and (4) heating the composite particles to melt the outer layer and to decompose or vaporize the inner particle to form an expanding inner gas bubble. The expanding gas bubble forms the molten outer layer into a shell of relatively large diameter. By cycling the temperature and pressure on the molten shell, nonuniformities in wall thickness can be reduced. The method of the invention is utilized to produce large uniform spherical shells, in the millimeter to centimeter diameter size range, from a variety of materials and of high quality, including sphericity, concentricity and surface smoothness, for use as laser fusion or other inertial confinement fusion targets as well as other applications.

The invention provides a method which is extremely versatile with respect to composition and size, and is capable of producing very uniform spheres of a predetermined size. The ability to produce very uniform sized droplets results in dried particles of heat decomposable or vaporizable material with essentially the same mass. The shell material includes glass for which previous well developed methods are available to produce smaller size spheres, but also extends to thermoplastic polymers and other materials which may be deposited by numerous conventional coating techniques. Thus the invention provides the capability to control the size and to select from a wide variety of shell materials, enabling the fulfillment of the requirements for the production of targets for the further development of laser and inertial confinement fusion methods.

BRIEF DESCRIPTION OF THE DRAWINGS

FIG. 1 is a flow chart of the process according to the invention for the production of large uniform hollow spherical shells.

DETAILED DESCRIPTION OF THE PREFERRED EMBODIMENTS

As shown with reference to the flow chart in FIG. 1, the invention is a method for producing a composite particle having a shell forming layer surrounding a particle of heat decomposable or vaporizable material. After the composite particle is produced, it is heated to cause the shell forming outer layer to become viscous and to decompose or vaporize the inner particle into an expanding gas bubble, causing the viscous outer shell to expand, which increases the shell diameter.

A solution of a suitable heat decomposable material, e.g., urea (or carbamide, $NH_2CONH_2$), is formed with a suitable solvent, e.g., water. Other heat decomposable materials including various ammonium compounds and solid alcohols can also be utilized. Alternatively, a heat vaporizable material can be used, i.e., a material which goes from solid to gas without decomposition. Generally, any material which is solid at one temperature and decomposes or vaporizes when heated to another temperature in a convenient process temperature range can be utilized. The major constraint is that the material or its decomposition products will remain in the spherical shell and so must be compatible with the use of the shells. Accordingly, urea is particularly preferred because its decomposition products are atmospheric gases.

Figure 2:
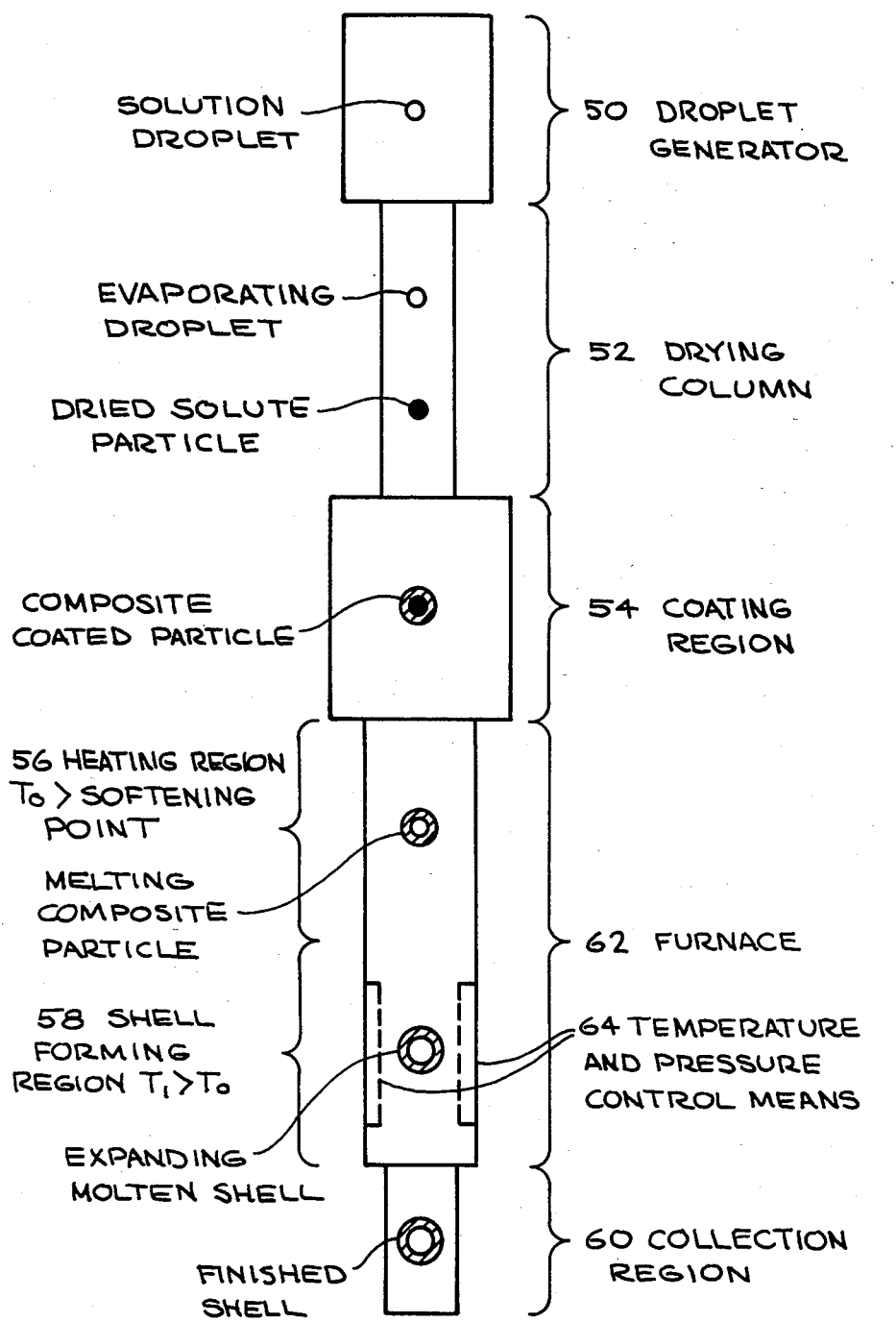
FIG. 2 is a schematic diagram of a multi-zoned verticle drop oven apparatus for the production of hollow spheres.

Droplets can be formed by using a droplet generator, such as described in U.S. Pat. Nos. 4,133,854 and 4,163,637 to Hendricks issued Jan. 9, 1979 and Aug. 7, 1979, respectively, and U.S. Pat. No. 4,257,799 to Rosencwaig, et al. issued Mar. 24, 1981, which are herein incorporated by reference. Using a droplet generator 50, as shown in FIG. 2, the solution of heat decomposable or vaporizable material is dispersed into very uniform drops of a predetermined size. The drops are then passed through a drying column 52, such as a single or multi-zoned temperature regulated oven as described in the above-referenced patents. The solvent in the drops is evaporated in a carefully controlled manner to leave particles of dried solute material, e.g., urea, all of which have the same mass of material. Alternatively, drops of a molten material can be formed, eliminating the need for a solvent. The drops are then dried in an oven to form particles.

The dry uniform mass particles are then coated with a layer of shell forming material, e.g., glass forming materials or thermoplastic polymer materials or other materials. The method is particularly applicable to very low temperatures and very low melting point glasses including compositions sometimes known as solder glasses. Suitable polymers include polystyrenes and polymethyl methacrylates.

The methods of coating the decomposable or vaporizable inner particles include sputtering, evaporation, chemical vapor deposition, deposition from a slurry, deposition from a solution or other particle coating techniques. Accordingly, the inner particles can be coated with fusible powders, layers of thermoplastic, meltable soft glasses, sputtered material or dry power. For example, a glass material formed into a frit or other solid material can be ground up and mixed with a binder, e.g., gum arabic or an artificial gum such as carboxy methylcellulose, and coated onto the inner particle. For illustration, the coating process occurs in the coating region 54 of FIG. 2.

The coated composite particles are then placed in an oven or furnace, or alternatively in a hot fluid, e.g., silicone oil. An oven or furnace 62 similar to the multi-zoned verticle drop furnaces described in the above-reference patents, and illustrated in FIG. 2, can be utilized. The particles first pass through a heating region 56 at a temperature above the softening point of the composite particles that will melt the outer layer of material to form a more or less viscous layer around the inner decomposable or vaporizable particle which may or may not start to decompose or vaporize. As illustrated in FIG. 2 the particle then passes through a higher temperature region 58 in which the shell is formed. The entire particle is further heated, either by longer residence time in the oven and/or by raising the temperature to decompose or vaporize the inner particle to form a gas bubble inside the molten outer layer. Expansion of the gases formed in the decomposition/vaporization process will cause the molten shell to expand, increasing the shell diameter while decreasing the thickness of the shell wall.

The final shell diameter, typically in the millimeter size range and larger, and shell thickness, typically in the range 2–50 microns, are determined by the choice of the decomposable or vaporizable material, its mass, and the mass of the shell material. In addition, a shell with an inner metal coating can be produced by putting the metal or metal compounds in the inner particle. The metal or metal compound will vaporize and/or decompose during the shell forming process when the particle decomposes or vaporizes and will form a coating on the inner shell wall. All the steps in the process including formation of the droplets, drying of the droplets, coating the inner particles and heating the particles are easily controllable, resulting in uniform shells of controllable size and thickness. Following the expansion of the shell to the desired diameter and wall thickness, cooling and collection of the cold rigid shells is performed by well known techniques, such as those utilized in the above-referenced patents for glass microsphere production. The shells are collected in region 60.

The thickness of the shell walls can be made more uniform by a process of temperature and pressure cycling. After a molten shell has been formed by decomposing or vaporizing the inner particle, the wall thickness may be somewhat nonuniform. The apparatus shown in FIG. 2 includes temperature and pressure contol means 64 in shell forming region 58 to alternatively increase and decrease the pressure on the hollow shell and to simultaneously cycle the temperature. The shell is brought to a temperature $T_0$ above the softening point of the shell, while the shell wall is nonuniform, i.e., the wall is thicker on one side and thinner on the other side. The temperature is then reduced to $T_1$, less than the softening point, so the thinner side will cool faster and the thicker side will cool slower. By simultaneously reducing the pressure on the hollow shell to a pressure lower than the internal pressure in the hollow shell (from the gaseous products of the decomposition or vaporization of the inner particle), the inner pressure will deform the shell more in the direction where the wall is softer and thicker to produce a nonspherical shell with uniform wall thickness. By then increasing the pressure on the shell to a pressure above the internal pressure, a spherical shell with uniform walls will be produced. The pressure and temperature cycling can be performed by levitating the particle on a hot gas stream while passing through the vertical oven. Porous walls in the vertical oven provide for better temperature control by controlling gas flow inwardly and keeping the shells away from the walls. In the hot liquid bath embodiment, the fluid is controllably pressurized and the temperature is controlled to permit the cycling process.

Figures 3A, 3B:
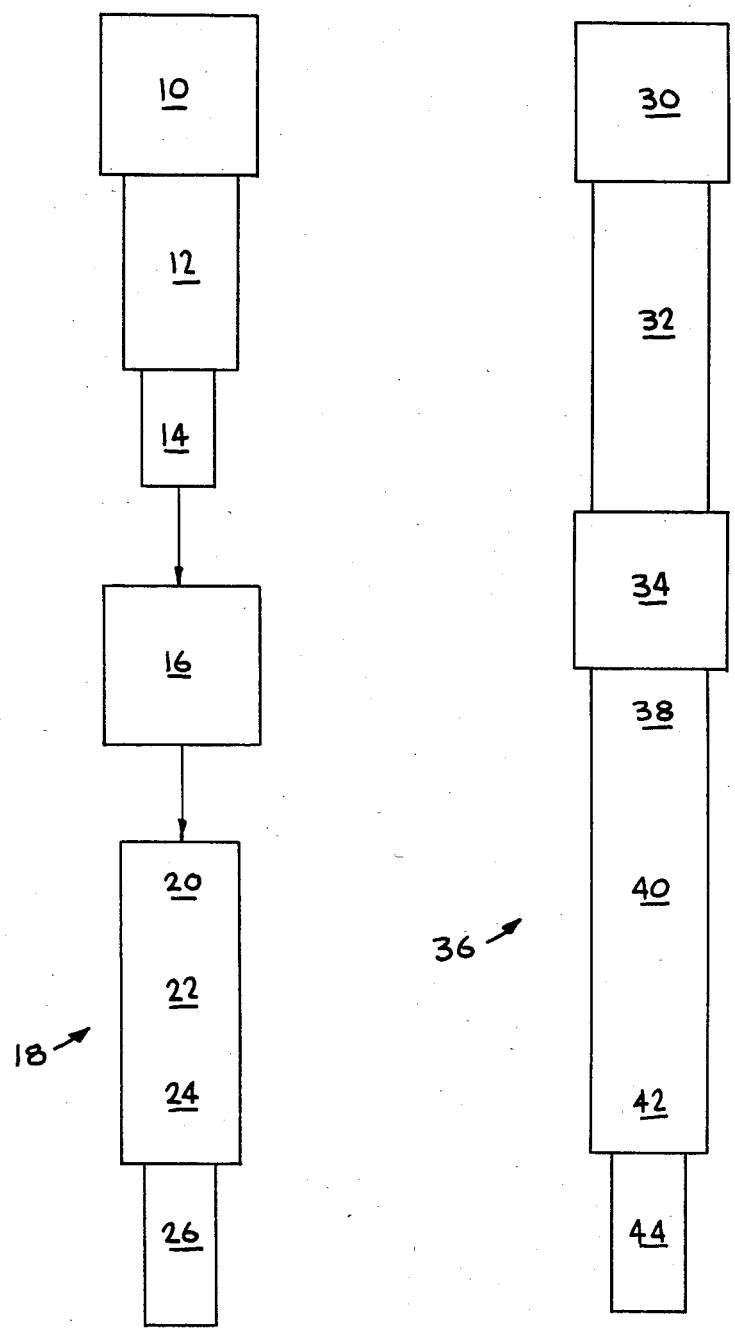
FIGS. 3A and B is a schematic diagram of apparatus for producing hollow spherical shells.

A variety of configurations of apparatus can be utilized to carry out the method according to the invention, such as illustrated schematically in FIGS. 3A and B. In one configuration, shown in FIG. 3A, droplet generator 10 forms uniform droplets of a solution of heat decomposable or vaporizable material. The droplets pass through a vertical oven 12 at a temperature below the decomposition temperature or gas release temperature of the blowing agent to form dried particles of heat decomposable or vaporizable material having uniform mass. The dried particles are collected in collection section 14 from which they are transferred to a coating apparatus 16 where the dried particles are coated with a layer of shell forming material. The coated particles are then transferred to a vertical multizone oven 18. The particles drop through a first region 20 where the outer layer becomes molten and then through a second region 22 at a higher temperature where the inner particle is decomposed or vaporized, forming an expanding gas bubble which expands the molten outer layer to a spherical shell. Alternatively, both melting and decomposition could occur in the same region. The shell then falls through a third region 24 of lower temperature where the shells become rigid and then are collected in collection region 26.

In a second configuration, shown in FIG. 3B, all the apparatus is arranged in a single vertical column, eliminating much of the need for collection, handling and physical transfer of the particles. A droplet generation 30 produces uniform droplets of heat decomposable or vaporizable material which fall through drying oven 32 to produce dried particles of uniform mass. The dried particles then drop through a coating section 34 where a layer of shell forming material is placed on the dried particles of heat decomposable material. The coated particles then fall through a multizone vertical oven 36 having segmented regions 38, 40 and 42 where in sequence the outer shell becomes viscous; the inner particle decomposes, producing a gas bubble which expands, causing the molten outer layer to expand to form a spherical shell; and the shells are cooled to become rigid. The shells are then collected in collection section 44. The vertical oven 36 may have porous walls for gas flow control. Temperature and pressure cycling within the oven 36 can be utilized to improve the uniformity of wall thicknesses.

To illustrate process parameters for carrying out the invention a drying column to make the uniform inner particles would typically operate at temperatures from 100° C.–300° C. and at a pressure of about 1 atm, although other pressures are possible. The shell forming process in which the coated composite particles are formed into shells is typically carried out at temperatures from 500° C.–1500° C. with the lower temperatures being used for polymer shell materials and the higher temperatures for high silicon glass materials. The shell forming process is normally carried out at about 1 atm pressure but may be carried out at lower pressures or higher pressures, to 10 atm or more. The shell forming process is normally conducted in a gaseous atmosphere, e.g., air, argon, xenon, krypton, which will be contained in the shell, along with products from the inner particle.

The temperature and pressure cycling step to improve wall thickness uniformity will depend on the material properties of the shell and the shell size. The temperature will be cycled below the softening point of the shell material, typically a few hundred degrees or less below the softening point. The internal and external pressure for the shell will be balanced according to the relation $P_1 = P_0 + 2\gamma/R$ where $P_1$ is the internal pressure, $P_0$ is the external pressure, $\gamma$ is the surface tension, and R is the shell radius. The surface tension varies with the material from very high values for some metals, e.g., platinum, to much lower values for other materials, e.g., polymers. The pressure variations for the cycling step are typically small, from a few hundredths of an atmosphere to a few tenths of an atmosphere, and generally less than ¼ atm. The temperature and pressure can be cycled a number of times while the shell is dropping through a column to increase wall thickness uniformity.

One application of the invention is to produce a shell from a viscous material, e.g., an epoxy. The dried inner particles are coated with the viscous material. While the material is viscous, the temperature and pressure cycling are performed to improve wall thickness uniformity. The shell is then finished either by heating or by the lapse of time to harden or cure the viscous shell into a hard shell.

Changes and modifications in the specifically described embodiments can be carried out without departing from the scope of the invention which is intended to be limited only by the scope of the appended claims.

I claim:

1. A method to produce large, uniform hollow spherical shells, comprising:

producing uniform drops of a predetermined size from a solution of heat decomposable or vaporizable material;

evaporating the drops to produce dried particles of heat decomposable or vaporizable material having uniform mass;

coating the dried particles with a layer of shell forming material to produce coated particles having uniform mass;

heating the coated particles to melt the layer of shell forming material and to decompose or vaporize the dried particles of heat decomposable or vaporizable material to produce an expanding gas bubble inside the molten layer of shell forming material which causes the outer layer to expand to a spherical shell with a controlled shell diameter and thickness;

first heating the spherical shell to a temperature above its softening point after decomposing or vaporizing the heat decomposable or vaporizable material;

then cooling the spherical shell to a temperature below its softening point to cool a thinner portion of the shell wall more quickly than a thicker portion of the wall;

simultaneously with cooling the shell lowering the external pressure on the shell to a pressure lower than the internal pressure in the shell to deform the shell to a nonspherical shell with uniform wall thickness;

then increasing the external pressure on the shell to a pressure greater than the internal pressure in the shell to produce a spherical shell with uniform wall thickness; and cooling the spherical shells.

2. The method of claim 1 wherein the drops are dried by passing through a vertical drop oven.

3. The method of claim 1 wherein the heat decomposable material is urea.

4. The method of claim 1 wherein the coated particles are heated by dropping through a temperature regulated multi-zone vertical drop oven.

5. The method of claim 1 wherein the coated particles are heated by immersion in a hot fluid.

6. The method of claim 5 wherein the hot fluid is silicone oil.

7. The method of claim 1 wherein the shell forming material is a glass forming material.

8. The method of claim 1 wherein the shell forming material is a thermoplastic polymer material.

9. The method of claim 1 wherein the dried particles are coated by forming the shell forming material into a powder, mixing the powder with a binder, and applying the mixture to the particles.

10. A method for increasing the uniformity in wall thickness of a spherical shell, comprising:

first heating the spherical shell to a temperature above its softening point;

then cooling the spherical shell to a temperature below its softening point to cool a thinner portion of the shell wall more quickly than a thicker portion of the wall;

simultaneously with cooling the shell lowering the external pressure on the shell to a pressure lower than the internal pressure in the shell to deform the shell to a nonspherical shell with uniform wall thickness; and then increasing the external pressure on the shell to a pressure greater than the internal pressure in the shell to produce a spherical shell with uniform wall thickness.

11. A method for producing uniform hollow spherical shells, including the steps of:

producing uniform drops of a predetermined size from a solution of heat decomposable or vaporizable material;

forming dried particles from the uniform drops;

heating the particles to form a spherical shell;

then cycling the temperature and pressure on the shell as follows:

heating the spherical shell to a temperature above its softening point;

then cooling the spherical shell to a temperature below its softening point to cool a thinner portion of the shell wall more quickly than a thicker portion of the wall;

simultaneously with cooling the shell lowering the external pressure on the shell to a pressure lower than the internal pressure in the shell to deform the shell to a nonspherical shell with uniform wall thickness; and then increasing the external pressure on the nonspherical shell to a pressure greater than the internal pressure in the shell to produce a spherical shell with uniform wall thickness.

12. The method of claim 11 wherein the particles are heated by dropping through a temperature regulated multi-zone vertical drop oven.

13. The method of claim 12 additionally including the step of providing at least a portion of the temperature regulated multi-zone vertical drop oven with porous wall surfaces for providing inward flow of gas through the wall into the oven to prevent the spherical shells passing through the oven from contacting the wall.

14. A method to produce large, uniform hollow spherical shells, comprising:

producing uniform drops of a predetermined size from a solution of heat decomposable or vaporizable material;

evaporating the drops to produce dried particles of heat decomposable or vaporizable material having uniform mass;

seeding the dried particle with a metal which vaporizes or a metal compound which decomposes during the shell forming process and coats the inner shell wall;

coating the dried particles with a layer of shell forming material to produce coated particles having uniform mass;

heating the coated particles to melt the layer of shell forming material and to decompose or vaporize the dried particles of heat decomposable or vaporizable material to produce an expanding gas bubble inside the molten layer of shell forming material which causes the outer layer to expand to a spherical shell with a controlled shell diameter and thickness; and cooling the spherical shells.

15. A method to produce large, uniform hollow spherical shells, comprising:

producing uniform drops of a predetermined size from a solution of heat decomposable or vaporizable material;

evaporating the drops to produce dried particles of heat decomposable or vaporizable material having uniform mass;

coating the dried particles with a layer of shell forming material to produce coated particles having uniform mass;

heating the coated particles to melt the layer of shell forming material and to decompose or vaporize the dried particles of heat decomposable or vaporizable material to produce an expanding gas bubble inside the molten layer of shell forming material which causes the outer layer to expand to a spherical shell with a controlled shell diameter and thickness by dropping the coated particles through a temperature regulated multi-zone vertical drop oven having porous wall surfaces for providing an inward flow of gas through the wall into the oven to prevent the spherical shells passing through the oven from contacting the walls; and cooling the spherical shells.

16. Apparatus for producing large uniform spherical shells comprising:

droplet generating means for producing uniform drops of a predetermined size from a solution of heat decomposable or vaporizable material;

drying means to evaporate the drops to produce dried particles having uniform mass;

coating means to coat the dried particles with a layer of shell forming material to produce coated particles having uniform mass;

heating means to heat the coated particles to melt the shell forming material and decompose or vaporize the heat decomposable or vaporizable material to produce an expanding gas bubble inside the layer of shell forming material to form a spherical shell with a controlled diameter and wall thickness;

pressure control means to alternately increase and decrease the pressure on the molten spherical shell;

temperature control means to simultaneously vary the temperature of the spherical shells; and cooling means to cool the spherical shells.

17. The apparatus of claim 16 wherein the temperature control means first heat the shell to a temperature above its softening point and then decrease the temperature below the softening point to cool thinner parts of the shell more quickly than thicker parts, and the pressure control means simultaneously, with the decrease in temperature, decrease the pressure on the shell to a pressure lower than the internal pressure in the shell to deform the shell to a nonspherical shell with uniform wall thickness and then increase the pressure above the internal pressure to form spherical shells with uniform wall thicknesses.

18. The apparatus of claim 16 wherein the drying means is a vertical drop oven.

19. The apparatus of claim 16 wherein the heating means is a temperature regulated multi-zone vertical drop oven.

20. The apparatus of claim 16 wherein the heating means is a temperature controlled pressurized liquid bath.

21. Apparatus for producing large uniform spherical shells comprising:

droplet generating means for producing uniform drops of a predetermined size from a solution of heat decomposable or vaporizable material;

drying means to evaporate the drops to produce dried particles having uniform mass;

coating means to coat the dried particles with a layer of shell forming material to produce coated particles having uniform mass;

heating means comprising a temperature regulated multi-zone vertical drop oven to heat the coated particles to melt the shell forming material and decompose or vaporize the heat decomposable or vaporizable material to produce an expanding gas bubble inside the layer of shell forming material to form a spherical shell with a controlled diameter and wall thickness;

the oven including a porous wall for providing inward flow of gas through the wall into the oven to prevent spherical shells passing through the oven to contact the wall; and cooling means to cool the spherical shells.

* * * * *